June 17, 1930.   R. P. MASE   1,765,087
LIQUID AND GAS CONTACT APPARATUS
Filed Aug. 2, 1928

WITNESS
A. B. Wallace.

INVENTOR
Roscoe P. Mase
By Brown & Critchlow
his Attorneys.

Patented June 17, 1930

1,765,087

UNITED STATES PATENT OFFICE

ROSCOE P. MASE, OF WILKINSBURG, PENNSYLVANIA

LIQUID AND GAS CONTACT APPARATUS

Application filed August 2, 1928. Serial No. 297,050.

The invention relates to liquid and gas contact apparatus, and has particularly to do with towers through which liquid flows downwardly and gas upwardly, the liquid and gas being brought into contact with each other by instrumentalities arranged between the top and bottom of the tower. While unlimited to any specific use or uses, the invention is particularly applicable to the absorption process of recovering gasoline from natural gas by bringing the gas into contact with an absorbing liquid such as relatively heavy petroleum hydrocarbons, to apparatus for the distillation of a liquid mixture of hydrocarbons by bringing the liquid into contact with steam, to apparatus for the fractionation of a mixture of hydrocarbons by bringing the liquid and vapor portions of it successively into intimate contact with each other under suitable temperature and pressure conditions, and to apparatus for humidifying or drying air or other gases by bringing a gas into contact with a liquid.

The object of the invention is to provide an apparatus of the type described whereby an increased number of contacts between a gas and liquid may be made without increasing the size of the tower, and whereby the contacts may be made in such a manner as to increase their effectiveness, and to consequently increase the efficiency of the apparatus.

A more special object of the invention is to provide a tower of the above described character having basins disposed between its top and bottom which are so shaped and arranged that the gas and liquid flowing through the tower passes the various sections of the basins with a substantially uniform velocity.

Figure 1:
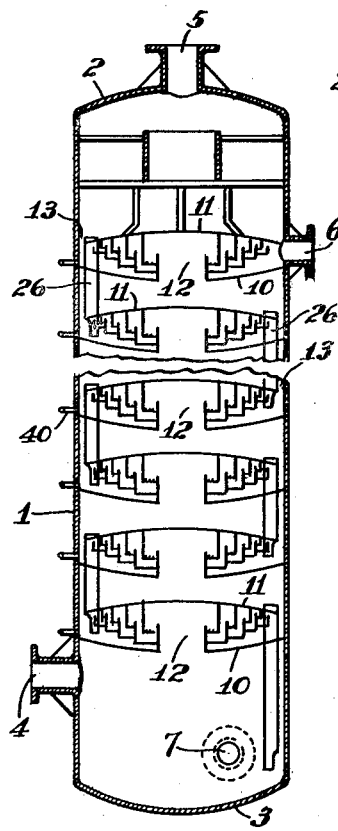
Figure 2:
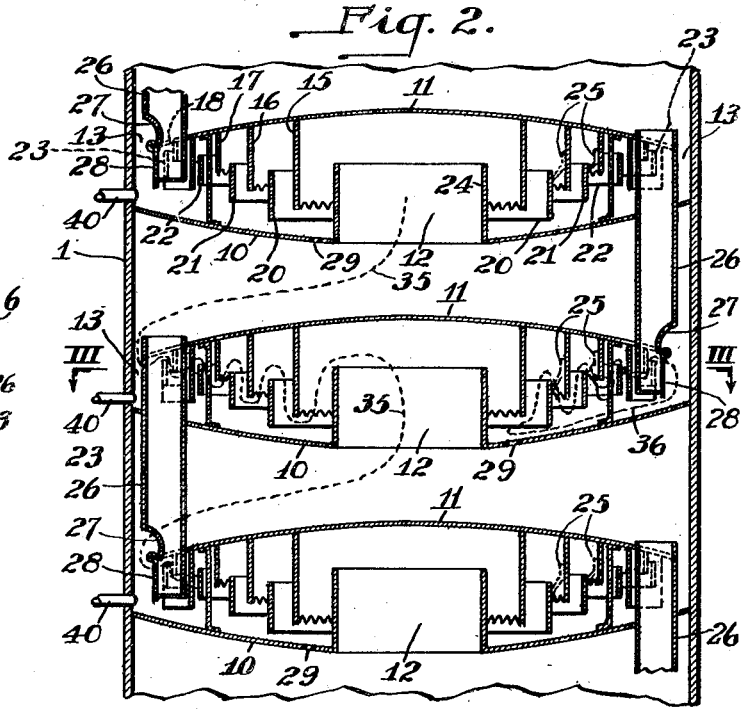
Figure 4:
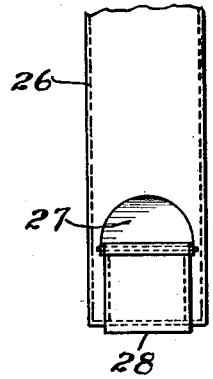
Figure 3:
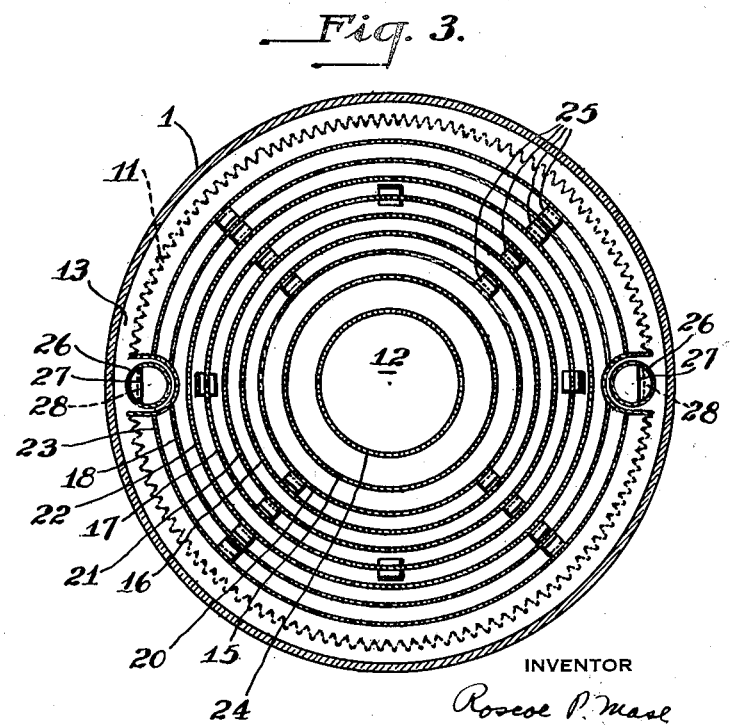

The invention is illustrated in the accompanying drawings, of which Fig. 1 is a somewhat diagrammatic vertical central sectional view of a liquid and gas contact tower; Fig. 2 a vertical central sectional view of a detached portion of the apparatus illustrated to enlarged scale; Fig. 3 a transverse sectional view taken on the line III—III, Fig. 2; and Fig. 4 a detached view of a detail of construction.

In the practice of this invention there is provided a tower having a gas inlet and a liquid outlet at its bottom and a liquid inlet and a gas outlet at its top. Between the top and bottom of the tower there are a plurality of liquid and gas contact units each comprising a transversely-extending liquid-containing basin and a cover arranged above the basin. Between the basin and cover of each unit there are a plurality of vertically-disposed baffles which cooperate with each other and with the basin and cover to cause gas to flow laterally in a circuitous path and make a plurality of contacts with the liquid in the basin. For the flow of liquid and gas into and from each unit, and from one to another of the several units, each unit is provided with passages offset with relation to each other for the flow of gas into and from the unit, and means are provided for conducting the liquid from a predetermined level in each unit downwardly to a lower unit.

Having reference first to Fig. 1, a vertical tower having a side wall 1, which is preferably cylindrical, a top 2 and a bottom 3, is provided near its bottom with a gas inlet 4 and at its top with a gas outlet 5. In its upper portion the tower is also provided with a liquid inlet 6, and near its bottom with a liquid outlet 7. The tower may be, and preferably is, constructed of metal plates which may be suitably welded or otherwise connected at their joints.

Arranged intermediate of its ends, the tower is provided with a plurality of liquid and gas contact units, the preferred construction of which is illustrated to enlarged scale in Figs. 2 and 3. Each unit comprises a basin 10 and a cover 11, the basin being provided with a gas inlet 12, which, although it may be otherwise disposed, is preferably at the center of the basin. Preferably the basin inclines upwardly in a concave form from its inlet 12 to its outer edge where it is welded, or otherwise connected and sealed, to the vertical wall 1 of the tower. The cover 11 of the unit is preferably of convex form, and extends over gas inlet 12 in such a manner as to cause the gas to flow laterally in a manner presently to be explained in detail, the gas escaping from the unit through an annular passage 13 formed between the edge of cover 11 and tower wall 1.

By constructing the contact units in the manner shown in the drawing, that is with the basins having an interior concave shape and the covers having an exterior convex shape rather than being of flat form, their load supporting strength is considerably increased. At the same time, due to the curvature of the basins there will be no excess of liquid around their outer portions unnecessarily loading them down and at the same time unduly increasing the amount of liquid contained by the tower under working conditions. By using convex covers for each unit, the liquid overflow from the unit may be effected above the exterior edge of the cover or gas outlet without necessitating it being raised to a level which will completely inundate the cover. Consequently, with the basins and covers so formed their liquid load is comparatively small. Further, a curved plate is capable of carrying several times the load of this character as a flat plate. Hence they may accordingly be made out of much thinner material than would be necessary if they were flat.

Two sets of baffles are arranged between the gas inlet 12 and outlet 13 of each unit. While the number of baffles may vary depending upon the number of contacts of gas and liquid it is desired to effect in each unit, the baffles of one set are positioned rather definitely with relation to those of the other. As illustrated, one set of baffles comprises cylinders or aprons 15, 16, 17 and 18 which extend downwardly from cover 11, their upper edges being welded, or otherwise connected and sealed, to the cover. The lower edges of these baffles are preferably of serrated or other irregular form to cause the gas flowing underneath them to be broken up into a large number of small streams. The second set of baffles are arranged between the elements of the first set, and comprises intermediate cylinders 20, 21, 22 and 23, which may be connected to and supported by the first set of baffles by brackets 25. Functioning somewhat as the intermediate baffles 20, 21, 22 and 23, there is a cylinder 24 extending upwardly from the gas inlet 12 to a point above the lower edge of baffle 15.

For conducting liquid downwardly from one unit to another, a tube 26 extends from a point somewhat above gas outlet 13 of each unit downwardly to a point near the bottom or base 10 of the next lower unit. Each tube is preferably closed at its bottom, and an offset 27 is formed in the side at the lower end thereof to which a one-way gate or check valve 28 is pivotally attached. Accordingly, the downward flow of liquid from one unit to another is conveniently effected, but gas is prevented from flowing upwardly through the tubes. The provision of such valve becomes especially important when, because of abnormal operating conditions, the supply of liquid to the apparatus is interrupted for a period long enough for one or more of the basins to become drained, and the supply of liquid then resumed. If it were not for the check valves in tubes 26, the gas passing upwardly would pass through tubes 26 between the empty units and prevent the liquid from flowing downwardly therethrough, and consequently cause the tower to become flooded when liquid supply is resumed.

The upper edge of each tube marks the level to which the liquid must rise at the edge of each unit to flow downwardly to a lower unit, and, as illustrated, the tubes are preferably arranged on opposite sides of the tower between adjacent pairs of basins to further the circulation of the liquid. If desired, the bottom of each basin may be provided with a small hole 29 near its lowest point forming an auxiliary outlet for the liquid whereby the basins may be conveniently emptied in case the liquid is shut off. These auxiliary outlets particularly serve to remove water from the low portion of the plate when oil or other lighter than water liquid is the principal scrubbing liquid or reflux.

There will now be explained the preferred arrangement and disposition of the two sets of baffles to effect a plurality of contacts of a gas with a liquid as they pass through a unit. The lower edge of baffle 15 is below the upper edge of cylinder 24, and the lower edge of baffles 16, 17 and 18 are at successively higher levels than the lower edge of baffle 15. The lower edge of intermediate baffle 20 is below the lower edge of baffle 15 to prevent the gas from flowing under it, and the upper edge of baffle 20 is above the lower edge of baffle 16. Intermediate baffles 21 and 22 are similarly disposed between their adjacent depending baffles 16, 17 and 18, and the lower edge of baffle 23 is below the lower edge of baffle 18. Gas entering a unit through its inlet 12 passes upwardly around the upper edge of cylinder 24, and then downwardly below the lower edge of baffle 15, depressing the liquid between the cylinder 24 and baffle 15 substantially to the level of the lower edge of baffle 15. The gas then passes upwardly around the upper edge of baffle 20 and downwardly below the lower edge of baffle 16 depressing the liquid in this chamber to substantially the level of the lower edge of baffle 16. In a similar manner gas flows through the successive annular chambers, depressing the liquid as explained, the gas flowing in the circuitous path generally indicated by the dash line 35 at the left of Fig. 2. This flow of gas causes quite a violent agitation and splashing of the liquid, bringing it into effective contact with the gas, and causing portions of it to flow in the general continuous and circuitous cycle indicated by the dash irregular line 36 at the right of the central unit of Fig. 2, the general cycle of flow of the liquid being shown only on opposite sides of a unit to avoid confusion. At its edge, cover 11 is of serrated or other irregular form to cause the gas flowing around it to be broken up into a large number of small streams.

To effect maximum efficiency, the cross sectional area for the flow of gas in its circuitous path laterally through a unit is preferably substantially uniform. To this end the radial spacing of the several baffles diminishes from the center of a unit outwardly, the increased peripheral extent of each passage from the center of a unit outwardly compensating for the diminished radial spacing. With this arrangement of baffles the liquid and gas in successive radial passages are spread in increasing attenuated layers from the center of a unit outwardly, and accordingly in one chamber or another there is a maximum contact efficiency for any rate of flow within quite a wide range of variation.

In the operation of the apparatus, assuming that it be for the absorption of gasoline from natural gas, an absorbing menstruum of relatively heavy hydro-carbon or other liquid continuously flows into tower 1 through its liquid inlet 6, and is continuously withdrawn from it through its liquid outlet 7 at its bottom. This liquid continuously flows downwardly from one unit to another through tubes 26, which, between successive pair of units, are arranged on opposite sides of the tower so that the liquid, or the main body of it, in order to flow from one unit to another passes from one to the other side of a unit. During this downward flow of liquid, gas flows upwardly through the successive units, the line of flow in each unit effecting a plurality of contacts as shown by the dot-and-dash line 36 on Fig. 2. In this way each successive unit brings the gas into a plurality of contacts with the liquid, so that an effective absorption of gasoline from the gas is attained by the time the liquid reaches the bottom of the tower.

The same procedure is followed in the distillation of a mixture of petroleum or other hydro-carbons, the liquid mixture to be distilled entering the tower through its liquid inlet 6, and steam entering the tower through gas inlet 4. When the apparatus is so used, the distillation takes place much in the same manner as in other tower apparatus for this purpose, except that in this apparatus the distillation is more efficiently done by a unit volume of tower by reason of the plurality of contacts of liquid and gas effected in each unit.

When the tower is used as a fractionating column the liquid reflux travels downwardly, and the vapors, entering the gas inlet near the bottom, travel upwardly in the same manner as already described in detail. Additional liquid reflux may be fed into the tower through suitable inlets 40 at or near the top or at one or several intermediate points. Likewise liquid may be withdrawn at other points than the one liquid outlet shown near the bottom. Correct pressure and proper temperature is maintained by any of several means well known to the fractionating art.

According to the provisions of the patent statutes, I have explained the principle and operation of my invention and have illustrated and described what I now consider to represent its best embodiment. However, I desire to have it understood that, within the scope of the appended claim, the invention may be practiced otherwise than by the particular apparatus specifically shown and described.

I claim as my invention:

A liquid and gas contact apparatus comprising a tower having a gas inlet and a liquid outlet at its bottom, and a liquid inlet and a gas outlet at its top; a plurality of contact units arranged between the top and bottom of the tower each comprising a transversely-extending, interiorly concaved liquid containing basin, an exteriorly convex cover having a serrated edge, a plurality of vertically disposed baffles arranged between and cooperating with the basin and cover, alternate baffles being serrated at their lower edges and arranged to permit the gas to flow below their lower edges, and the intermediate baffles being positioned to prevent the gas flowing under their lower edges but permitting it to flow above them, whereby the gas is caused to make a plurality of contacts with the liquid in the basin, said baffles forming a circuitous passage of substantially uniform cross sectional area throughout for the lateral flow of gas; each basin being provided with a centrally located gas inlet, and each cover having a gas outlet at its exterior edge, and means for conducting liquid from a predetermined level above the outer edge and below the centrally raised portion of the cover in each unit downwardly into a lower unit, said conducting means being provided with a check valve for preventing gas from flowing upwardly through it.

In testimony whereof, I sign my name.

ROSCOE P. MASE.